June 23, 1953     T. G. HARE     2,643,040
LUGGAGE CARRIER FOR AUTOMOBILE TOPS
Filed Nov. 6, 1951     2 Sheets-Sheet 1
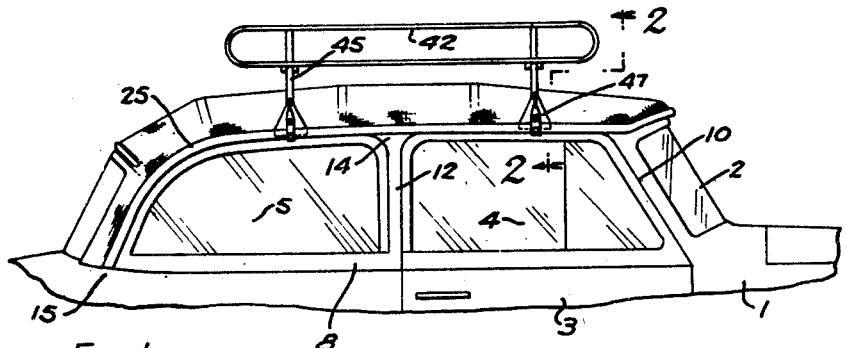
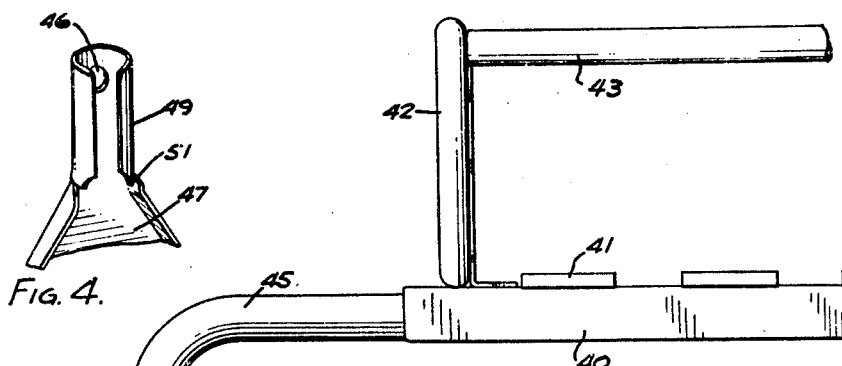
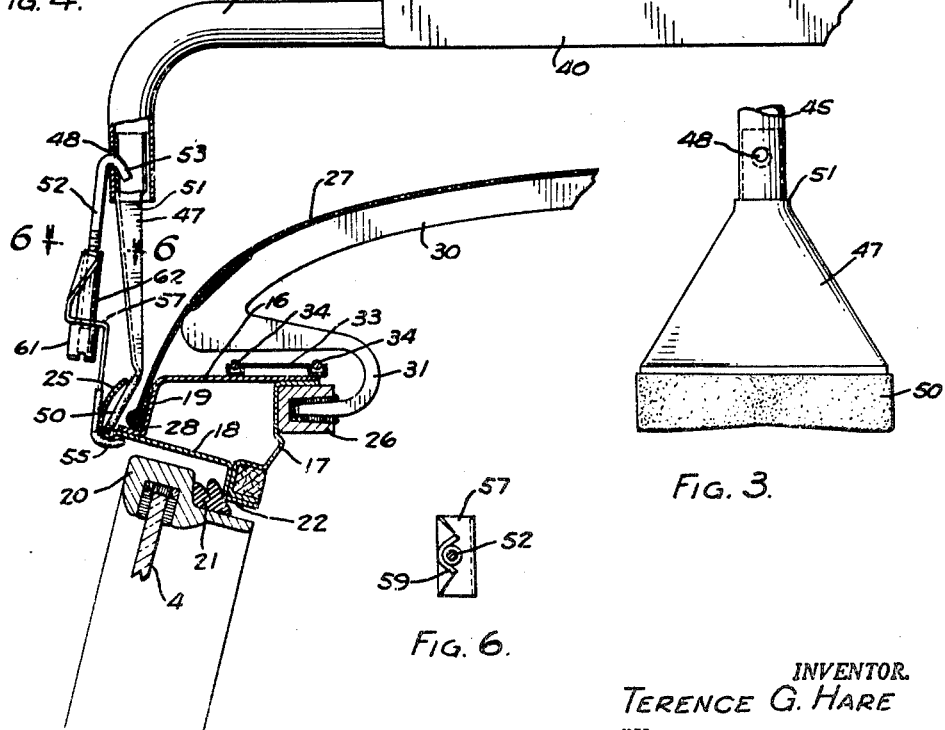
INVENTOR.
TERENCE G. HARE
BY
ATTORNEYS.

June 23, 1953 T. G. HARE 2,643,040
LUGGAGE CARRIER FOR AUTOMOBILE TOPS
Filed Nov. 6, 1951 2 Sheets-Sheet 2

INVENTOR.
TERENCE G. HARE
BY
Barnes, Kisselle, Laughlin & Raisch
ATTORNEYS.

Patented June 23, 1953

2,643,040

UNITED STATES PATENT OFFICE 2,643,040

LUGGAGE CARRIER FOR AUTOMOBILE TOPS

Terence G. Hare, Detroit, Mich., assignor to Miller Manufacturing Co., Detroit, Mich., a corporation of Michigan Application November 6, 1951, Serial No. 255,055

2 Claims. (Cl. 224—42.1)

1

This invention relates to carrier means for carrying material on and above the top portions of automotive vehicles, and particularly passenger automobiles.

The invention is concerned particularly with improvements in the attaching means and in the load supporting means which transfers the load to the vehicle construction. When the device is referred to as a luggage carrier, it is to be appreciated that the term "luggage" is used in a very broad manner to cover any sort of material or object or objects which one desires to transport.

Some automotive vehicles are what are known as convertibles. This means that the top covering of the vehicle can be lowered and placed out of operative position so that the vehicle or, perhaps, more specifically, the vehicle body, is then in the nature of an open car. The tops or covering material for cars of this type are usually cloth and may, therefore, be easily folded or collapsed, so to speak. Some of these vehicles have a relatively strong permanent side frame construction which remains in place when the top is folded away and the present invention provides means for supporting a luggage carrier from these frame portions. The cloth top covering and its supporting means are not adapted to support an overhead load. However, in accordance with the present invention, the carrier is supported by the frame structure and in such a manner that the top or fabric covering means may be shifted and operated into and out of its operative position and its inoperative condition.

A carrier structure made in accordance with the invention is shown in the accompanying drawings and some parts of the automotive vehicle are shown.

Fig. 1 is a side elevational view of a portion of an automobile illustrating a carrier of the present invention.

Fig. 2 is an enlarged cross sectional view taken substantially on line 2—2 of Fig. 1 showing some of the structural features of the carrier and also of the vehicle.

Fig. 3 is an elevational view of a supporting foot.

Fig. 4 is a partial elevational view showing structure of the supporting foot.

Fig. 6 is a view partly in section taken on line 6—6 of Fig. 2.

2

Figure 9:
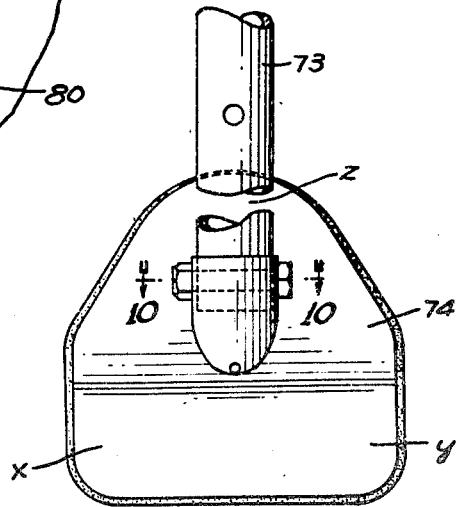

Fig. 9 is an elevational view of a modified form showing the supporting foot and attachment to the supporting member.

Figure 10:
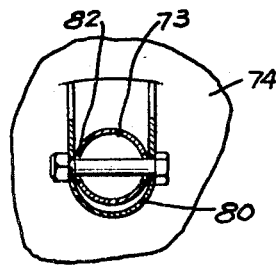

Fig. 10 is a cross sectional view taken substantially on line 10—10 of Fig. 9.

The vehicle, as shown in Fig. 1, has a body generally illustrated at 1, a windshield 2, a door 3, with a window 4, and a window 5 positioned to the rear of the door. The body has permanently located structural side members above the belt line, the belt line being generally illustrated at 8, and this includes the pillar post 10, at one edge of the windshield, and an intermediate post 12. There is also a substantially horizontally extending top structure which extends from the pillar post 10 rearwardly and then curves downwardly at the rear, meeting the body or belt line, at about the point 15.

As shown in Fig. 2, this horizontal structural element may be of box construction having a top strip or portion 16, an inner portion 17, a lower portion 18, an outer wall or portion 19. The door 3 has a top channel member 20 for receiving the glass panel 4 and a weather strip 21 is arranged to seal against the portion 22 of the permanent top construction.

The permanent top or rail construction has a drip trough 25, as shown, and an interior channel 26. The top covering material or fabric is illustrated at 27 and it has an edge or bead 28 which fits over the outside member 19 and the top construction involves several bows 30 attached to the material 27. The bows have arm portions 31 which extend into the channel 26 for guiding and supporting purposes. On the top member 16 is a structure generally illustrated at 33 in which is guided cables 34.

It will be appreciated that the construction of the vehicle is the same on both sides and that Fig. 2 and Fig. 1 show the collapsible top in operating position. To collapse the top, the several bows slide backwardly in the channels 26 to the rear part of the vehicle. This, however, leaves the rail structure 14 in position. To place the top in operative position, the forwardmost bow is pulled upwardly and forwardly. The several bows are attached to the cables 34 and in this manner the bows may slide into and out of position.

The carrier embodies transverse frame members 40 which may have longitudinally extending slats 41 and side elements 42 with reinforcing cross members 43. Each cross member 40, which may be of tubular construction, may receive telescopingly a leg 45 which bends downwardly as shown in Fig. 2.

A supporting foot is shown in Figs. 3 and 4. This foot is somewhat in the shape of a plate and its body 47 is of tapered form and its upper end has a tubular shaped portion 49 provided with an aperture 48. The foot is preferably fashioned from sheet metal and a shoulder formation 51 is at the intersection between the body 47 and the tubular portion 49. The lower end of the foot is in the form of a relatively thin plate structure having substantial length. This portion is illustrated at 50 and it is conveniently covered with plastic or rubber to prevent it from scratching or marring the paint or finish on the vehicle.

In the structure shown, four of these supporting feet are used, and their lower blade like ends are placed in the drip trough as shown in Fig. 2. The blade like end portion 50 is, where needed, disposed angularly relative to the body 47 so as to properly fit into the drip trough. The tubular legs 45 telescope over the portions 49 and may rest upon the shoulders 51. This supports the vertical load of the carrier and its contents. The elongated portions 50, while being relatively thin in geometrical shape, have substantial length so that the load is distributed lengthwise of the drip trough. In the structure of the vehicle described, such structure is adequate for supporting the load. It is to be appreciated, however, that the structure is not limited in its use to automobile bodies of the convertible type but may be used with automobiles having permanent tops and provided with a drip trough or other structure for receiving the supporting feet and the hold-down hooks.

Figure 5:
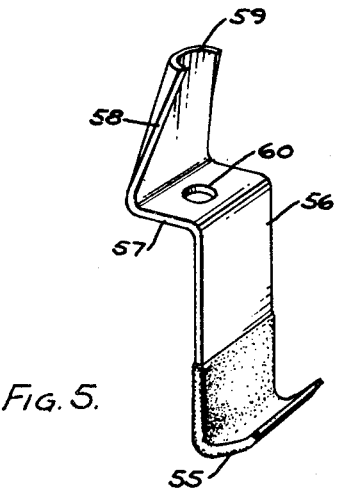
Fig. 5 is a view of the hold-down hook.

To hold the carrier in position, there is a screw threaded anchor rod 52 with a hook 53 received in the apertures 48 and 46. There is also an eave hook member, as shown in Fig. 5, having a lower hook portion 55 for engaging under the drip trough as shown in Fig. 2. This hook portion as shown, is also preferably covered with rubber or plastic so that it does not mar the finish. This hook member has an upstanding body portion 56, a laterally extending offset 57 and an upstanding upper end 58 fashioned to provide a concavity 59. The offset portion 57 has an aperture 60 therein.

There is a barrel nut, having a head portion 61 and a barrel portion 62. The nut is passed through the aperture 60 so that its head underlies the offset 57 with the upper end of its barrel portion fitting into and journalled in the concavity 59. The threaded end of the anchor rod is engaged in the nut as shown at 34 and by turning the nut the assembly is tightened with the foot pulled downwardly and seated within the drip trough and with the hook 55 engaging under the drip trough.

It will be observed that with this arrangement, the carrier is strongly supported by the frame structure of the vehicle so that all vertical load falls on the permanent side structure of the vehicle and that the carrier is firmly held in place by the anchor rod and eave hook. It is very easy to mount the carrier substantially in the manner above described and to remove the carrier, it is only necessary to loosen the barrel nuts sufficiently to disengage them from the underside of the eave troughs then the carrier structure may be lifted off.

It will also be noted that this carrier construction offers no interference to the manipulation of the top of the vehicle which resides in the bows 38 and the fabric covering 37. The load supports 40 are positioned above the top material so that no structural part engages the same. The edge or bead 28 of the top material may freely pass the load supporting feet in the movement incident to the lowering or raising of the top material and its bows.

Figure 7:
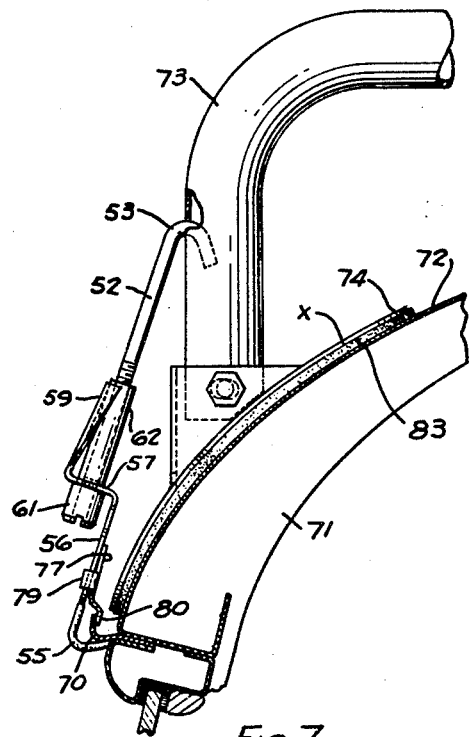
Fig. 7 is a view similar to Fig. 2 illustrating a modified arrangement.

In some vehicle constructions the drip trough is of proportions such that it may be difficult for the hook 55 to remain engaged therewith. In Fig. 7 the drip trough 70 is one of this type, the same being shown as mounted on a vehicle body, generally illustrated at 71 with a roof or top portion 72. The carrier leg 73, as shown, is provided with a pad or saddle 74 for resting on the roof, and the load of the carrier and contents is supported in this manner. The eave hook and the anchor rod and the barrel nut may be the same as above described and the same reference characters are applied thereto.

Figure 8:
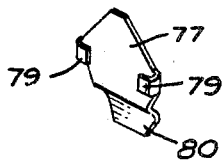
Fig. 8 is an elevational view of a lock member used in the modified form.

A lock member 77 as shown in Fig. 8 is arranged on one side of the portion 56 of the hold-down hook and it has a pair of fingers or tangs 79 fashioned around on the opposite side of the hold-down hook so that the locking member is slidable thereon. The locking member has a finger 80 for engaging behind the drip trough 70 as shown in Fig. 7. The locking member may be engaged or released by shifting the same slidably on the eave hook.

The shoe 74 has a curve somewhat as shown in Fig. 7 generally to follow the contour of the top 72, and its general contour is as indicated in Fig. 9. This contour is somewhat of a three-sided or triangular shape so that it has three areas of contact generally indicated at x, y and z. The body of the shoe which may be fashioned from sheet metal is formed with an upstanding hollow projection 80 for receiving the end of the leg 73 (Fig. 10). A bolt is passed through apertures in the hollow portion 80 and through relatively enlarged apertures 82 in the leg. Thus, the shoe may rock on the bolt and the bolt may shift or rock in the enlarged apertures 82 relative to the leg 73 and, accordingly, the shoe 74 is connected to the leg 73 in the manner so that it has a limited amount of universal movement. Thus the shoe 74 may oscillate relative to the leg 73 and adjust itself to contact with the top 72. Preferably, the shoe has an inner facing of plastic or rubber 83 so as to not mar the surface of the top and due to its universal mounting and its three points of contact x, y and z, it adapts itself to the compound curvatures usually found in the top 72 of automotive vehicles. The shape and curvature of the tops of various vehicles vary but the universal mounting and the three-point contact principle provides for the shoe making good stable contact with most any model or make of automotive vehicle.

I claim:

1. In a luggage carrier for the top of an automobile which has a drip trough extending longitudinally along each side of and near the top, support means for luggage adapted to be positioned above the top, said support means having downwardly extending tubular supporting legs, a plurality of supporting members, one for each leg, each fashioned from sheet metal and having a tubular upper portion for telescopingly fitting within a downwardly extending supporting leg, a lower body portion substantially of triangular shape with the apex at the intersection with the upper portion, the lowermost part of the body portion being relatively long and blade-like for fitting in the drip trough to thereby distribute the load on the drip trough over substantially the length of the said lowermost part, and a shoulder substantially at the intersection of the tubular upper portion and the triangularly shaped body portion upon which the tubular supporting leg rests.

2. In a luggage carrier for the top of an automobile which has a drip trough extending longitudinally along each side of and near the top, support means for luggage adapted to be positioned above the top, said support means having downwardly extending tubular supporting legs, a plurality of supporting members, one for each leg, each fashioned from sheet metal and having a tubular upper portion for telescopingly fitting within a downwardly extending supporting leg, a lower body portion substantially of triangular shape with the apex at the intersection with the upper portion, the lowermost part of the body portion being relatively long and blade-like for fitting in the drip trough to thereby distribute the load on the drip trough over substantially the length of the said lowermost part, a shoulder substantially at the intersection of the tubular upper portion and the triangularly shaped body portion upon which the tubular supporting leg rests, hold-down means for each tubular supporting leg, including a hook for passing through the tubular supporting leg and the tubular upper portion of the supporting member, a hook for engaging under the drip trough and screw thread means for connecting the two hooks.

TERENCE G. HARE.

References Cited in the file of this patent

UNITED STATES PATENTS

| Number | Name | Date |
|---|---|---|
| 1,748,282 | Ellis | Feb. 25, 1930 |
| 2,436,228 | Purchase | Feb. 17, 1948 |
| 2,506,421 | Hacker et al. | May 2, 1950 |

FOREIGN PATENTS

| Number | Country | Date |
|---|---|---|
| 974,493 | France | Sept. 27, 1950 |